United States Patent [19]

Rahman

[11] 4,420,770

[45] Dec. 13, 1983

[54] VIDEO BACKGROUND GENERATION SYSTEM

[75] Inventor: Atlaf Rahman, Stamford, Conn.

[73] Assignee: Thomson-CSF Broadcast, Inc., Stamford, Conn.

[21] Appl. No.: 365,775

[22] Filed: Apr. 5, 1982

[51] Int. Cl.³ .............................................. H04N 5/22
[52] U.S. Cl. ....................................... 358/183; 358/22
[58] Field of Search ................................... 358/22, 183

[56] References Cited

U.S. PATENT DOCUMENTS

| | | | |
|---|---|---|---|
| 4,218,710 | 8/1980 | Kashigi | 358/183 |
| 4,245,244 | 1/1981 | Lijewski | 358/183 |
| 4,281,345 | 7/1981 | Wärn | 358/183 |

*Primary Examiner*—Michael A. Masinick
*Attorney, Agent, or Firm*—Martin Novack

[57] ABSTRACT

A system for producing video signals representative of video patterns having operator-selected video attributes is disclosed. A vertical bit memory includes a plurality of vertical entity memories, each vertical entity memory having a memory bit for each line of a video frame. A horizontal bit memory includes a plurality of horizontal entity memories, each horizontal entity memory having a memory bit for each elemental horizontal reference position of a video frame. A vertical address generator is used to access the vertical entity memories in parallel. A horizontal address generator is used to access the horizontal entity memories in parallel. Means are provided for entering in the horizontal entity memories and vertical entity memories, respectively, binary indications of operator-selected horizontal and vertical coordinates defining diagonally opposite corners of operator-selected video patterns for one or more operator-selected entities. A plurality of vertical and horizontal start/stop detectors are provided. Coincidence detectors are provided, one for each entity, each generating an output for its respective entity as a function of coincident outputs from the vertical and horizontal start/stop detectors for the entity. A priority encoder is responsive to the outputs of the coincidence detectors for generating an output designating the highest priority entity that is on at a given time. An entity attribute look-up memory is responsive to the output of the priority encoder to generate output video-representative signals having attributes that were previously stored in said attribute look-up memory.

10 Claims, 5 Drawing Figures

ODD FIELD TIMING

EVEN FIELD TIMING

VIDEO BACKGROUND GENERATION SYSTEM

BACKGROUND OF THE INVENTION

This invention relates to video generating apparatus and, more particularly, to a system for producing video signals representative of video patterns having operator-selected video attributes.

Apparatus for producing video signals have become quite sophisticated in recent years, and may now include equipment for generating various types of operator-controlled graphics presentations that can be used by themselves, or, for example, in conjunction with keyed-in program video. Modern video graphics equipment has the ability to produce backgrounds, characters, symbols, and other pictorial representations and arrangements in operator-selected sizes, shapes, and colors. Notwithstanding the obvious advantages of having equipment with such sophisticated capabilities, the potential number of users of such equipment is ncessarily limited by the cost which accompanies increasing complexity.

One feature that is particularly desirable in the type of system described is the ability to flexibly generate video backgrounds of operator-selected sizes, locations, and colors. The most common background shape is rectangular; for example, one or more strips or boxes of color background upon which is superimposed television titling or other graphical information. Also, one or more rectangular background areas can be combined to obtain various types of graphics presentations.

It is an object of the present invention to set forth a digital video background generator that provides flexible and versatile operation and is relatively inexpensive to implement. It is another object of this invention to set forth a system which minimizes complexity and cost when employed in apparatus that has interlaced fields in each frame, such as standard NTSC television.

SUMMARY OF THE INVENTION

The present invention is responsive to the need for an economical, efficient, and flexible technique for generating video backgrounds. The invention is applicable for use in conjunction with a video generating apparatus that includes means for producing vertical and horizontal synchronizing signals and clock signals. In accordance with the invention there is provided a system for producing video signals representative of video patterns having operator-selected video attributes. As defined herein, video attributes can be any controllable characteristics of a video signal, such as luminance and color characteristics. A vertical bit memory is provided and includes a plurality of vertical entity memories, each vertical entity memory having a memory bit for each line of a video frame. A horizontal bit memory is provided and includes a pluratlity of horizontal entity memories, each horizontal entity memory having a memory bit for each elemental horizontal reference position of a video frame. A vertical address generator is responsive to the horizontal synchronizing signals for counting scanlines of a video frame and generating vertical entity memory addresses used to access the vertical entity memories in parallel. A horizontal address generator is responsive to clock signals for generating horizontal entity memory addresses used to access the horizontal entity memories in parallel. Means are provided for entering in the horizontal entity memories and vertical entity memories, respectively, binary indications of operator-selected horizontal and vertical coordinates defining diagonally opposite corners of operator-selected video patterns for one or more operator-selected entities. A plurality of vertical start/stop detectors are provided, each being responsive to the output of a respective vertical entity memory. A plurality of horizontal start/stop detectors are provided, each being responsive to the output of a respective horizontal entity memory. A plurality of coincidence detectors are provided, one for each entity, each generating an output for its respective entity as a function of coincident outputs from the vertical and horizontal start/stop detectors for the entity. A priority encoder is responsive to the outputs of the coincidence detectors for generating an output designating the highest priority entity that is on at a given time. An entity attribute look-up memory is reponsive to the output of the priority encoder to generate output video-representative signals having attritubes that were previously stored in said attribute look-up memory in conjunction with each entity.

In an embodiment of the invention, a frame of video includes interlaced fields of video, and there is further provided a field correction logic means that is operative, in conjunction with the vertical address generator, for temporarily changing the scanline count so as to temporarily produce a vertical entity memory address corresponding to an adjacent scanline in the field not presently being scanned. In this embodiment, the field correction logic means includes means for selectively enabling the vertical start/stop detectors to sample outputs from the vertical entity memories for the scanlines of the field being scanned and also for the adjacent scanlines of the other field when said field correction logic means causes the vertical entity memory addresses to correspond to the adjacent scanlines. Accordingly, the field correction logic provides flexibility which allows the selected pattern to begin on either an odd or an even line (i.e. in either video field) and also to end on either an odd or an even line.

Further features and advantages of the invention will become more readily apparent from the following detailed description when taken in conjunction with the accompanying drawings.

BRIEF DESCRIPTION OF THE DRAWINGS

FIG. 4A and FIG 4B, shows signal waveforms that are useful in understanding operation of the field correction logic circuitry.

DESCRIPTION OF THE PREFERRED EMBODIMENT

Figure 1:
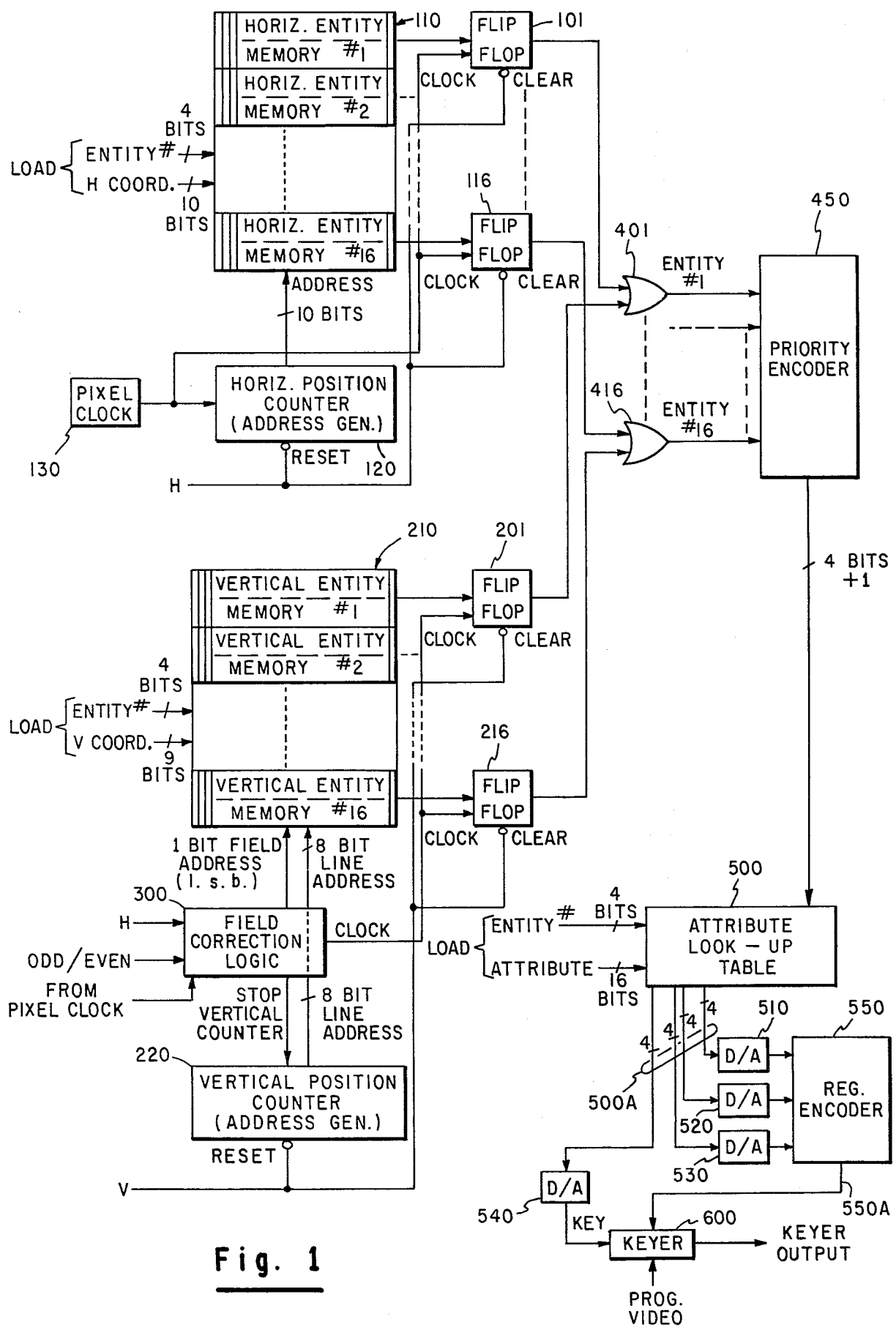
FIG. 1 is a block diagram of a video pattern generating system in accordance with an embodiment of the invention.

Referring to FIG. 1, there is shown a block diagram of a system in accordance with an embodiment of the invention for generating rectangular video patterns having operator-selected video attributes. The invented system is typically employed in conjunction with an overall plant for generation of television-type video signals, such as is typically used by a television broadcaster or a video movie production facility. It is assumed that regular program video is conventionally being produced, by means not shown, in conjunction with conventional video timing signals, including vertical and horizontal synchronizing and driving signals. In the present embodiment it is also assumed that NTSC video, having two interlaced fields per frame, is being used, although it will be understood that the invention is applicable to other types of video format. A basic pixel clock 130, which operates at a rate defining a basic horizontal picture element of the system, is shown in FIG. 1, although it may typically be part of the basic video system. It is also assumed that conventional operator inputting devices, such as keyboard, monitor, cursor control, and graphical digitizer (none of which are shown) are typically available.

In the illustrated embodiment, there are provided a horizontal bit memory 110 and a vertical bit memory 210. The horizontal bit memory 110 includes sixteen 1024 × 1 horizontal entity memories; i.e., one such memory for each video background entity, there being sixteen possible video background entities in the present embodiment. The RAM memory for each entity has 1,024 one-bit memory slots, the address of each bit or memory slot being a ten-bit binary address. An additional four bits are used to select a particular one of the sixteen entities.

The vertical bit memory 210 includes sixteen 512 × 1 vertical entity memories; i.e., again, one for each video background entity. The RAM memory for each entity of memory 210 has 512 one-bit memory slots, the address of each bit or memory slot being defined by a nine-bit binary address. An additional four bits are, as above, used to select a particular one of the sixteen entities.

During loading of the horizontal and vertical bit memories, which typically occurs during the vertical blanking period, a particular entity (i.e., one of the sixteen entities, designated entity #1 through entity #16) is selected by the operator via a keyboard (not shown). The operator also selects the h and v coordinates of the points which define the diagonally opposite corners of the rectangular background entity to be generated, these coordinates also being typically selected via a keyboard, or via a cursor generator (not shown). Coordinate selection subsystems, used to input operator-selected coordinates via a keyboard or using a cursor are well known in the art and are not an inventive feature hereof. Reference can be made, for example, U.S. Pat. No. 3,740,743 for a description of the loading during blanking in a video graphic system. [The video attributes of the entity are also typically selected by the operator at the same time, as described hereinbelow.]

In the FIG. 1 embodiment the four bits labelled "entity #" represent the operator-selected entity number, the ten bits labelled "h coordinate" represent the operator-selected h-coordinate for a point of the entity. The nine bits labelled "v coordinate" represent the operator-selected v-coordinate of said particular point of the entity. When loading the horizontal and vertical bit memories, selected memory slots of a selected entity memory are accessed to enter (or delete, as the case may be) "1"'s which indicate the h and v point coordinates of a particular rectangular background area being entered. This is done by storing "1"'s at the memory locations corresponding to the diagonally opposite corners of the background area being entered. During the active video frame, the memory slots of the horizontal bit memory 110 and the vertical bit memory 210 are sequentially accessed and the memory contents are read out.

In the horizontal bit memory 110, the address being accessed at any particular moment is determined by a ten bit horizontal position counter 120 which counts clock pulses from pixel clock 130. At the beginning of each scanline, the horizontal position counter 120 is reset by a signal derived from horizontal sync signal and then begins to count clock pulses from the pixel clock 130. Accordingly, the output of the horizontal position counter 120 is a number from 0 to 1023 that is representative of the instantaneous horizontal position of the video raster scan. As noted above, each of the entity memories of the horizontal bit memory 110 has 1024 memory slots represented by 1024 respective addresses (there being one memory slot for each of up to 1024 horizontal elements). The output of the horizontal position counter is used to access in parallel all sixteen of the horizontal entity memories. In other words, when a particular address is output from the horizontal position counter 120, that address is accessed in each of the individual entity memories of the horizontal bit memory 110. For example, when the ten bit output of horizontal positions counter 120 is say, "0000001100" (twelve in decimal), memory slot twelve of each entity memory of the horizontal bit memory will be accessed and its contents will be read out.

During the active video frame, the vertical bit map memory 210 also has all of its individual entity memories accessed in parallel. In this case, however, the address generated corresponds to the current line number of the video raster scan. In particular, an eight bit line counter 220 is reset by the vertical blanking signal and is stepped by a signal derived, via the field correction logic, from the horizontal sync signal. Accordingly, the output of line counter 220 is an eight bit signal which is representative of up to 256 visible lines per video field. The output of line counter 220 is coupled to field correction logic 300, which also receives as inputs the horizontal sync signal and a binary odd/even signal indicative of whether an odd or even video field is currently being presented. The output of the field correction logic is a nine bit line address representing one of 512 addresses; i.e. 256 lines per field for each of the odd and even fields. This nine bit address is used to accesss in parallel the memory slot in each vertical entity memory having an address corresponding to the current line. In accordance with the feature of the invention, the field correction logic functions in a special manner that will be described in further detail hereinbelow. However, it suffices for the present portion of the description to envision the output of the field correction logic as generating the nine bit line address used to access the appropriate memory slots of all of the vertical entity memories of vertical bit memory 210.

The output of the horizontal entity memories #1 through #16 are respectively coupled to toggle flip-flops 101 through 116, and the outputs of the vertical entity memories #1 through #16 are respectively coupled to toggle flip-flops 201 through 216. The flip-flops are reset to produce an initial logical state of "0" by the vertical blanking signal, in the case flip-flops 210–216, and by the horizontal sync signal, in the case of flip-flops 101–116. The flip-flops 101–116 are enabled to sample by clock pulses from pixel clock 130, and the flip-flops 201–216 are enabled to sample by clock signals from the field correction logic 300 (to be described). The outputs of the flip-flops 101 and 201 (which receive the outputs of horizontal entity memory #1 and vertical entity memory #1, respectively) are coupled to an AND gate, which is designated 401. Similarly, the pairs of flip-flops associated with the horizontal and vertical entity memories for each entity # are coupled to the inputs of an AND gate for the particular entity, so there are sixteen AND gates designated 401 through 416. The sixteen outputs of AND gates 401 through 416 are received by a priority encoder circuit 450. The priority encoder may be, for example, two cascaded Texas Instrument No. 74148 encoding circuits. The output of priority encoder circuit 450 is a four bit binary signal that is indicative of the number of the highest priority input to priority encoder circuit 450. An additional bit can be used to indicate the condition where all of the entities are "off", i.e., all "0" outputs from the AND gates 401 through 416.

An attribute look-up memory or table 500 preferably comprises a random access memory that has stored therein sixteen bit words that are read out on the lines 500A. In the present embodiment, the attribute look-up table 500 includes sixteen memory locations, each of which contains sixteen bits of information representative of a color video output, i.e., four bits representing a red video component, four bits representative of a blue video component, four bits representative of a green video component, and four bits representative of a keying level. In particular, during loading of entity information by an operator (or from storage), the sixteen bits representative of selected video attributes for each entered entity are stored at the address for said entity. This loading of the video attributes for an entity will typically be implemented in conjunction with the loading of operator selected coordinates which define the background area that is to possess the selected video attributes (as described above in conjunction with the horizontal and vertical bit memories 110 and 210). The bits representative of the red, green and blue video components are respectively coupled to digital-to-analog converters 510, 520 and 530, and the bits representative of keying level are coupled to digital-to-analog coverter 540. The outputs of digital-to-analog converters 510, 520 and 530 are respectively coupled to a conventional RBG encoder 550 whose output is a video signal 550A that is coupled to the "background video" input of a conventional non-additive keyer 600. A "foreground" video input is received at the other input of keyer 600. The output of digital-to-analog converter 540 is applied to the keying input of keyer 600. It will be understood that in operation, the keying and color attributes of the highest priority entity (at a particular element or pixel of a video frame) are input to the keyer 600 to control the area and type of background that are to appear in the output video.

Figure 2:
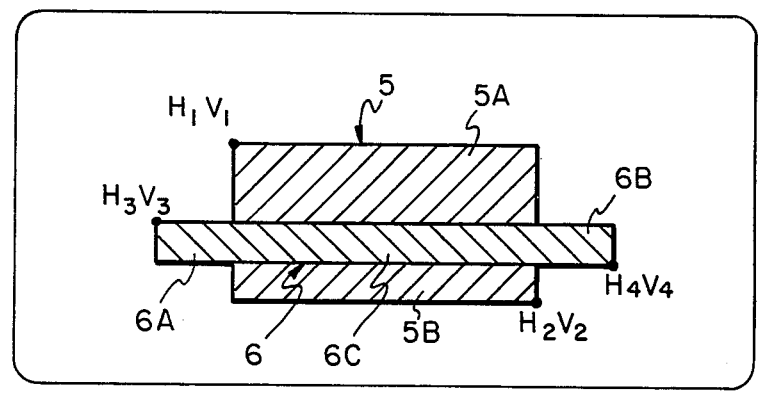
FIG. 2 illustrates patterns generated in accordance with an embodiment of the invention, and is useful in understanding operation of the invention.

FIG. 2 illustrates operation of the embodiment of FIG. 1 for a situation where an entity (e.g. entity #1) defines rectangular area 5 having diagonally opposing corner points having coordinates $h_1v_1$ and $h_2v_2$ and a higher priority entity (e.g. entity #2) defining rectangular area 6 having diagonally opposing corner points at coordinates $h_3$, $v_3$ and $h_4$, $v_4$ (where h and v are horizontal and vertical reference variables). When these entities are loaded into the system, their entity numbers will be entered, along with a code representing their attributes (e.g. color and keying status), and "1"'s will be entered at addresses $h_1$ and $h_2$ of horizontal entity memory #1, addresses $h_3$ and $h_4$ of horizontal entity memory #2, addresses $v_1$ and $v_2$ of vertical entity memory #1 and addresses $v_3$ and $v_4$ of vertical entity memory #2. In this example it is therefore seen that the flip-flop 101 will be turned on at a horizontal reference position $h_1$ during each scanline and be turned off at a horizontal reference position $h_2$ during each scanline, and the flip-flop 102 will be turned on at a horizontal reference position $h_3$ during each scanline and turned off at a horizontal reference position $h_4$ during each scanline. Also, the flip-flop 201 will be turned on during scanline $v_1$ and will be turned off during scanline $v_2$, and flip-flop 202 will be turned on during scanline $v_3$ and turned off during scanline $v_4$. Accordingly, it will be understood that the entity #1 AND gate 401 will produce an output that is on during the time that rectangle 5 is being scanned, and the entity #2 AND gate 402 will produce an output that is on during the time that rectangle 6 is being scanned. During the time that only the output of entity # AND gate 401 is on (areas 5A and 5B), the priority encoder will produce an output indicative of a code for entity #1, and the attribute look-up table 500 will generate an output indicative of the stored video attributes of rectangle 5. During the time that only the output of entity #2 AND gate is on (areas 6A and 6B), the priority encoder will produce an output indicative for a code for entity #2, and the attribute look-up table 500 will generate an output indicative of the stored video attributes of rectangle 6. In the time of scanning the overlapped region 6C, the outputs of both entity #1 AND gate 401 and entity #2 AND gate 402 will be on. During such time, the priority encoder 450 will select the higher active entity (entity #2 in this example) and generate an output code representative of said higher active entity #2, thereby causing overlapped region 6C to be presented with the stored video attributes of the rectangle 6. It is readily seen that similar operation is applicable to a situation of three or more rectangular video background entities entered into the bit memories 110 and 210.

The description of FIG. 1 did not deal in detail with operation of the field correction logic 300, which is provided for use in conjunction with field interlaced video. It is desirable to have a background area to be generated begin or end on either an odd or an even field line. (If such flexibility were not provided, for example by having all background areas begin and end on an odd field, implementation would be easier, but the vertical selectivity would be cut in half). However, in such case provision must be made to determine if an on or off bit indication (which controls the start/stop flip-flops 201–216) occurs in the field which is not being scanned at the time. The field correction logic 300 is used to implement a "look" at the field which is not being scanned, this being done during the horizontal retrace of each scanline.

Figure 3:
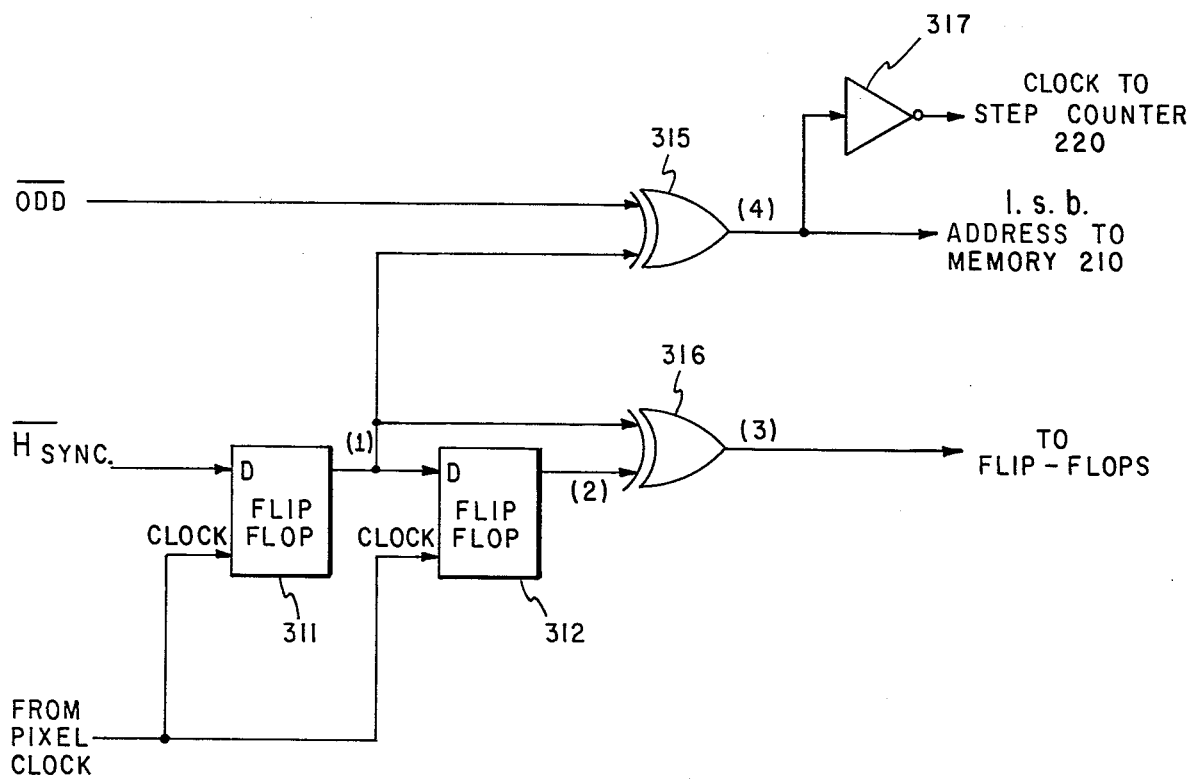
FIG. 3 is a block diagram of field correction logic circuitry of FIG. 1.

Referring to FIG. 3, there is shown a block diagram of the field correction logic 300. A D-type flip-flop 311 receives clock pulses from the basic clock at its clocking input, and receives the inverse of the horizontal sync signal at its control input. The output of flip-flop 311 is coupled to the control input of another D-type flip-flop 312, the clock input of which also receives the basic clock. The output of flip-flop 311 is also an input to each of two exclusive OR gates 315 and 316. The other input of exclusive OR gate 315 receives a field-indicative bit (in particular, an indication of the inverse of the odd field). The other input to exclusive OR gate 316 is the output of flip-flop 312.

The output of exclusive OR gate 315 is the least significant bit of the address coupled to the vertical bit map. Also, this output is inverted by an inverter 317 and is coupled as a clock to the vertical line counter 220 used for address generation. The output of exclusive OR gate 316 is coupled to the clock inputs of the flip-flops 210–216.

Figure 4:
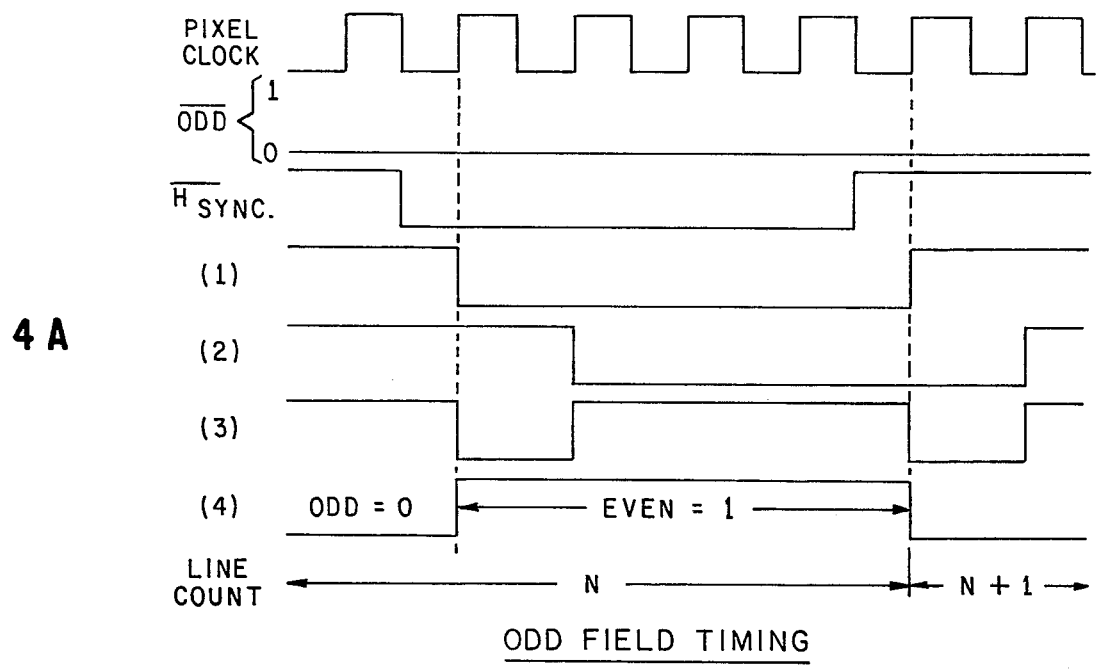
FIG. 4, which includes
Figure 4:
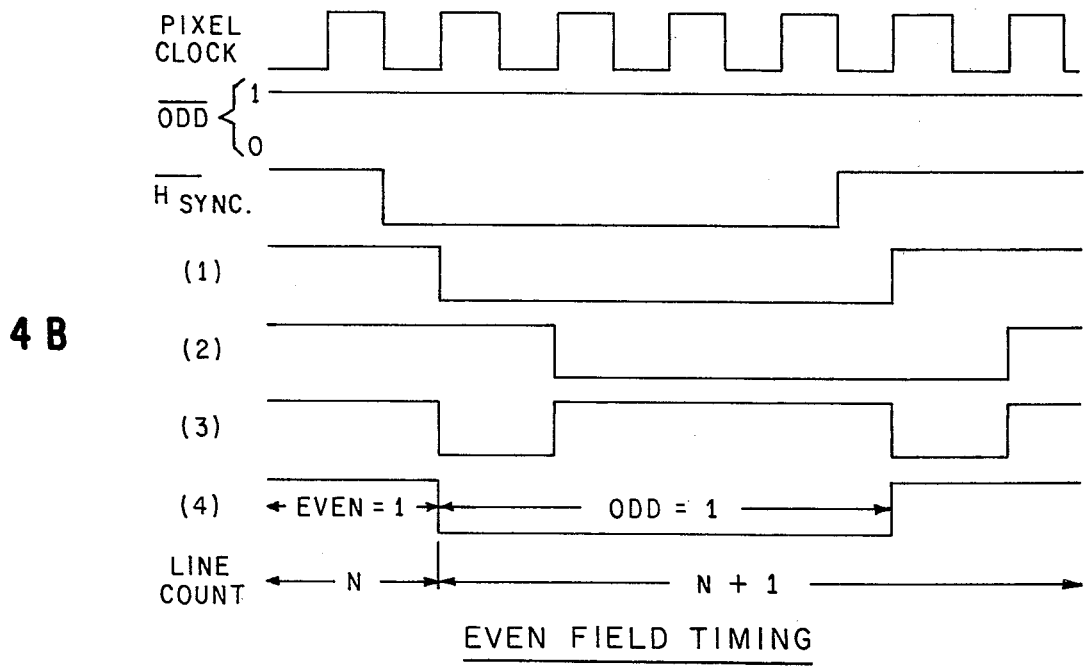

FIG. 4 shows typical waveforms at various points in the circuit of FIG. 3 at the beginning of a scanline, and is useful in understanding operation of the circuit. FIG. 4A illustrates the signal timing during an odd field, and FIG. 4B illustrates the signal timing during an even field. In each instance, the parenthetical numbers to the left of a waveform indicate the place in the circuit of FIG. 3 at which the waveform appears.

Regarding the odd field timing shown in FIG. 4A, the basic clock waveform is shown on top and next below is the inverse of signal "odd", which is seen to be low (since it is assumed to be an odd field situation). Next lower signal shown is the inverse of the horizontal sync signal which occurs at the beginning of each scanline. When the inverse of horizontal sync goes low (at the beginning of a scanline), the next positive-going edge of the pixel clock causes the signals (1) and (3) to go low and the signal (4) to go high. The signal (4) is applied to the vertical bit memory 210 as the least significant address bit, a "1" output being indicative of an even field in the present embodiment. It is noted that the line counter 220 had not yet been incremented, such incrementing being effected by the positive-going edge of the inverted signal (4), as will occur momentarily. Accordingly, the effect of this status is that the line count output of line counter 220 is now at the previous line of the frame behind the actual present odd line of the frame; i.e., it is set "behind" to the previous even line count. Now, when the next positive-going clock pulse causes signal (2) to go low, the signal (3) (that is, the output of exclusive OR gate 316) will go high, causing sampling by the start/stop flip-flops 201–216 of FIG. 1. In this manner, the flip-flops receive bits in all entities that are in the even scanline behind the present odd scanline.

At the end of the horizontal sync signal, the next positive-going edge of a clock pulse causes signal (1) to go high which, in turn, causes signal (3) to go low and signal (4) to go low. This will, in turn, cause a positive-going edge at the output of inverter 317 which serves to increment the vertical line counter 220. Thus, the line count, including its least significant bit, will have now been switched to a status that properly reflects the present odd line. When the next positive-going edge of the clock causes the signal (2) to go high and, therefore, the sampling signal (3) to also go high, the flip-flops 201–216 will again be caused to sample. Summarizing, then, during the odd field, before the information in the vertical bit memory is sampled for a given scanline, the circuitry of the field correction logic 300 causes sampling of the prior line in the even field.

During an even field, as illustrated in conjunction with the waveforms of FIG. 4B, the signal which is the inverse of "odd" (input to exclusive OR gate 315 in FIG. 3) is high, and this causes a difference in the operation of the field correction logic of FIG. 3. In particular, the result in this case is that the line counter will be incremented [signal (4)] at the next positive-going edge of the basic clock which occurs after the inverse of horizontal sync goes low. Also, signal (4) will go low, meaning that the least significant bit will indicate an odd field line. Therefore, at the next positive-going edge of the basic clock, signal (3) will go high causing sampling by flip-flops 201-14 216 of FIG. 1. In this condition, the line whose information is sampled is the subsequent odd line. Next, at the end of the horizontal sync signal, the inverse of horizontal sync goes high, whereupon the signals (1) and (4) go high and the signal (3) goes low. The signal (4) going high means that the output of the vertical line counter 222 [including its least significant bit, which is signal (4)] indicates the present even line. Then, again, the next positive-going edge of the basic clock causes signal (3) to go high which again results in sampling by the flip-flops 201–216.

Thus it is seen that the field correction logic operates to cause sampling of the bit in each vertical entity memory for the adjacent scanline of the companion odd or even field that is not currently being scanned.

I claim:

1. For use in conjunction with a video generating apparatus that includes means for producing vertical and horizontal synchronizing signals and clock signals, a system for producing video signals representative of video patterns having operator-selected video attributes, comprising:

a vertical bit memory including a plurality of vertical entity memories, each vertical entity memory having a memory bit for each line of a video frame;

a horizontal bit memory including a plurality of horizontal entity memories, each horizontal entity memory having a memory bit for each elemental horizontal reference position of a video frame;

a vertical address generator for counting scanlines of a video frame and generating vertical entity memory addresses used to access the vertical entity memories in parallel;

a horizontal address generator responsive to clock signals for generating horizontal entity memory addresses used to access the horizontal entity memories in parallel;

means for entering, in the horizontal entity memories and vertical entity memories, respectively, binary indications of operator-selected horizontal and vertical coordinates defining diagonally opposite corners of operator-selected video patterns for one or more operator-selected entities;

a plurality of vertical start/stop detectors, each being responsive to the output of a respective vertical entity memory;

a plurality of horizontal start/stop detectors, each being responsive to the output of a respective horizontal entity memory;

a plurality of coincidence detectors, one for each entity, each generating an output for its respective entity as a function of coincident outputs from the vertical and horizontal start/stop detectors for the entity;

a priority encoder responsive to the outputs of the coincidence detectors for generating an output designating the highest priority entity that is on at a given time; and an entity attribute look-up memory which is responsive to the output of said priority encoder to generate output video-representative signals having attributes that were previously stored in said attribute look-up memory in conjunction with each entity.

2. Apparatus as defined by claim 1 further comprising keying means for combining said video-representative signals with program video.

3. Apparatus as defined by claim 1, wherein said start/stop detectors comprise flip-flops and said coincidence detectors comprise AND gates.

4. Apparatus as defined by claim 2, wherein said start/stop detectors comprise flip-flops and said coincidence detectors comprise AND gates.

5. A system as defined by claim 1, wherein a frame of video includes interlaced fields of video, and further comprising field correction logic means, operative in conjunction with said vertical address generator, for temporarily changing the scanline count so as to temporarily produce a vertical entity memory address corresponding to an adjacent scanline in the field not presently being scanned.

6. A system as defined by claim 2, wherein a frame of video includes interlaced fields of video, and further comprising field correction logic means, operative in conjunction with said vertical address generator, for temporarily changing the scanline count so as to temporarily produce a vertical entity memory address corresponding to an adjacent scanline in the field not presently being scanned.

7. A system as defined by claim 4, wherein a frame of video includes interlaced fields of video, and further comprising field correction logic means, operative in conjunction with said vertical address generator, for temporarily changing the scanline count so as to temporarily produce a vertical entity memory address corresponding to an adjacent scanline in the field not presently being scanned.

8. The system as defined by claim 5, wherein said field correction logic means includes means for selectively enabling said vertical start/stop detectors to sample outputs from the vertical entity memories for the scanlines of the field being scanned and also for the adjacent scanlines of the other field when said field correction logic means causes the vertical entity memory addresses to correspond to the adjacent scanlines.

9. The system as defined by claim 6, wherein said field correction logic means includes means for selectively enabling said vertical start/stop detectors to sample outputs from the vertical entity memories for the scanlines of the field being scanned and also for the adjacent scanlines of the other field when said field correction logic means causes the vertical entity memory addresses to correspond to the adjacent scanlines.

10. The system as defined by claim 7, wherein said field correction logic means includes means for selectively enabling said vertical start/stop detectors to sample outputs from the vertical entity memories for the scanlines of the field being scanned and also for the adjacent scanlines of the other field when said field correction logic means causes the vertical entity memory addresses to correspond to the adjacent scanlines.

* * * * *